United States Patent
Ho et al.

(10) Patent No.: US 10,180,705 B2
(45) Date of Patent: Jan. 15, 2019

(54) OPERATING MODE DISTINGUISHING METHOD, TOUCH POINT LOCATING METHOD AND TOUCH CONTROL CIRCUIT

(71) Applicant: ILI TECHNOLOGY CORP., Hsinchu County (TW)

(72) Inventors: Kai-Ting Ho, Hsinchu Hsien (TW); Guo-Kiang Hung, Hsinchu Hsien (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 15/801,627

(22) Filed: Nov. 2, 2017

(65) Prior Publication Data
US 2018/0143666 A1 May 24, 2018

Related U.S. Application Data

(62) Division of application No. 15/083,458, filed on Mar. 29, 2016.

(30) Foreign Application Priority Data

Apr. 1, 2015 (TW) .............................. 104110706 A

(51) Int. Cl.
G06F 1/16 (2006.01)
G06F 3/044 (2006.01)
G06F 3/041 (2006.01)

(52) U.S. Cl.
CPC ............ G06F 1/1656 (2013.01); G06F 3/044 (2013.01); G06F 3/0416 (2013.01)

(58) Field of Classification Search
CPC combination set(s) only.
See application file for complete search history.

(56) References Cited

U.S. PATENT DOCUMENTS

2015/0268782 A1* 9/2015 Kim .................... G06F 3/044
345/174

FOREIGN PATENT DOCUMENTS

TW 201504904 A 2/2015

* cited by examiner

*Primary Examiner* — Van N Chow
(74) *Attorney, Agent, or Firm* — JCIPRNET

(57) ABSTRACT

An operating mode distinguishing method, a touch point determining method and a touch control circuit are provided. It is determined whether an underwater mode is entered according to a self capacitance value and a mutual capacitance value. In the underwater mode, a touch point position is determined according to deformation of a substrate.

10 Claims, 7 Drawing Sheets

OPERATING MODE DISTINGUISHING METHOD, TOUCH POINT LOCATING METHOD AND TOUCH CONTROL CIRCUIT

This application is a divisional of U.S. patent application Ser. No. 15/083,458, entitled "Operating Mode Distinguishing Method, Touch Point Locating Method and Touch Control Circuit" and filed Mar. 29, 2016, which claims the benefit of Taiwan application Serial No. 104110706, filed Apr. 1, 2015, the subject matter of which is incorporated herein by reference.

BACKGROUND OF THE INVENTION

Field of the Invention

The invention relates in general to an operating mode distinguishing method, a touch point locating method and a touch control circuit, and more particularly to an operating mode distinguishing method, a touch point locating method and a touch control circuit applied for underwater operations.

Description of the Related Art

As smart phones and tablet computers have become mainstream information products, touchpads that perform command input using touch control gestures have also become popular human-machine interface (HMI) control apparatuses among users.

FIG. 1a shows a sectional view of a conventional capacitive touchpad. As shown, a plurality of sensing electrodes 11 to 14 are disposed below a substrate 1, which is a cover lens made of glass, for example. When a finger 19 touches the top of the substrate 1, some of the sensing electrodes 11 to 14 are coupled to the finger 19 to generate changes in capacitance values. For example, a self capacitance CS3 of self capacitances CS1 to CS4 in the diagram has a change in the capacitance value due to the touch of the finger 19. The sensing electrodes 11 to 14 are then scanned by a touch control circuit (not shown) to detect changes in mutual capacitances CM1 to CM3 among the sensing electrodes 11 to 14 and/or the above self capacitances CS1 to SC4, hence further estimating the position of the finger 19.

The number of portable devices with a waterproof function is increasing. However, when a portable device including the abovementioned capacitive touchpad is operated under water, water 18 covering the top of the substrate 1 (as shown in FIG. 1b) may cause an effect similar to an entire hand pressing upon the capacitive touchpad, leading to an issue of incapable of effectively determining the touch position. Therefore, there is a need for a capacitive touchpad that is operable under water.

SUMMARY OF THE INVENTION

It is a primary object of the present invention to provide an operating mode distinguishing method applied to a capacitive touch apparatus. The operating mode distinguishing method includes: obtaining a self capacitance value and a mutual capacitance value in the capacitive touch apparatus; entering a first operating mode when a change in the self capacitance value does not exceed a first threshold and a rising range of the mutual capacitance value is greater than a second threshold; and entering a second operating mode when the rising range of the mutual capacitance value is not greater than the second threshold.

According to an embodiment of the present invention, the operating mode distinguishing method further includes: entering the second operating mode when the change in the self capacitance value exceeds the first threshold.

According to an embodiment of the present invention, the first operating mode is an underwater mode, and the second operating mode is a normal mode.

It is another object of the present invention to provide a touch point locating method applied to a capacitive touch apparatus. The capacitive touch apparatus includes a plurality of sensing electrodes and a common electrode. The touch point locating method includes: providing a touch sensing signal to the sensing electrodes when the capacitive touch apparatus operates in a normal mode, and providing the touch sensing signal to the common electrode when the capacitive touch apparatus operates in an underwater mode; detecting a plurality of capacitance values from the sensing electrodes in response to the touch sensing signal, respectively; and determining a position of a touch point according to the capacitance values.

According to an embodiment of the present invention, the touch point locating method further includes: providing a fixed voltage to the sensing electrodes when the capacitive touch apparatus operates in the underwater mode and the touch sensing signal is inputted to the common electrode.

According to an embodiment of the present invention, when the capacitive touch apparatus operates in the underwater mode, the capacitance values are capacitance values between the sensing electrodes and the common electrode.

According to an embodiment of the present invention, the touch point locating method further includes: correcting the position of the touch point by a position correcting correspondence table.

According to an embodiment of the present invention, the capacitive touch apparatus further includes a substrate. The sensing electrodes are disposed on the substrate. The touch point causes deformation of the substrate to change a distance between the common electrode and at least one sensing electrode of the sensing electrodes.

According to an embodiment of the present invention, the capacitive touch apparatus further includes a substrate. The sensing electrodes are disposed on the substrate. The capacitance values are associated with deformation of the substrate caused by the touch point.

It is another object of the present invention to provide a touch control circuit for controlling a capacitive touchpad. The capacitive touchpad includes a plurality of sensing electrodes and a common electrode. The touch control circuit includes: a capacitance sensing unit, when operating in a normal mode, outputting a touch sensing signal to the sensing electrodes and detecting a plurality of capacitance values from the sensing electrodes to accordingly generate a sensing result, when operating in an underwater mode, outputting the touch sensing signal to the common electrode, and detecting the plurality of capacitance values from the sensing electrodes to accordingly generate the sensing result; and a calculating unit, calculating a position of a touch point according to the sensing result.

According to an embodiment of the present invention, when operating in the underwater mode, the capacitance sensing unit detects a plurality of capacitance values between the sensing electrodes and the common electrode from the sensing electrodes.

According to an embodiment of the present invention, the capacitive touchpad further includes a substrate. The sensing electrodes are disposed on the substrate. When the touch control circuit operates in the underwater mode, the capacitance values are associated with deformation of the substrate caused by the touch point.

According to an embodiment of the present invention, when the touch control circuit operates in the underwater mode, the capacitance sensing unit further outputs a fixed voltage to the common electrode.

It is yet another object of the present invention to provide a touch control circuit for controlling an operating mode of a capacitive touch apparatus. The capacitive touch apparatus includes a plurality of sensing electrodes. The touch control circuit includes: a capacitance sensing unit, detecting a self capacitance value and a mutual capacitance value from the sensing electrodes; and an operating mode distinguishing unit, determining an operating mode of the capacitive touch apparatus according to the self capacitance value and the mutual capacitance value. When a change in the self capacitance value does not exceed a first threshold and a rising range of the mutual capacitance value is greater than a second threshold, the operating mode distinguishing unit determines that the capacitive touch apparatus operates in a first operating mode. When the rising range of the mutual capacitance value is not greater than the second threshold, the operating mode distinguishing unit determines that the capacitive touch apparatus operates in a second operating mode.

According to an embodiment of the present invention, when the change in the self capacitance value exceeds the first threshold, the operating mode distinguishing unit determines that the capacitive touch apparatus operates in the second operating mode.

According to an embodiment of the present invention, the first operating mode is an underwater mode, and the second operating mode is a normal mode.

The above and other aspects of the invention will become better understood with regard to the following detailed description of the preferred but non-limiting embodiments. The following description is made with reference to the accompanying drawings.

DETAILED DESCRIPTION OF THE INVENTION

Characteristics and advantages of the present invention are given in detail in the description of some typical embodiments below. It should be noted that, various modifications made to the embodiments are to be encompassed within the scope of the present invention. Further, the description and drawings of the application are substantially for illustration purposes, and are not to be construed as limitations to the present invention.

Figure 1A:
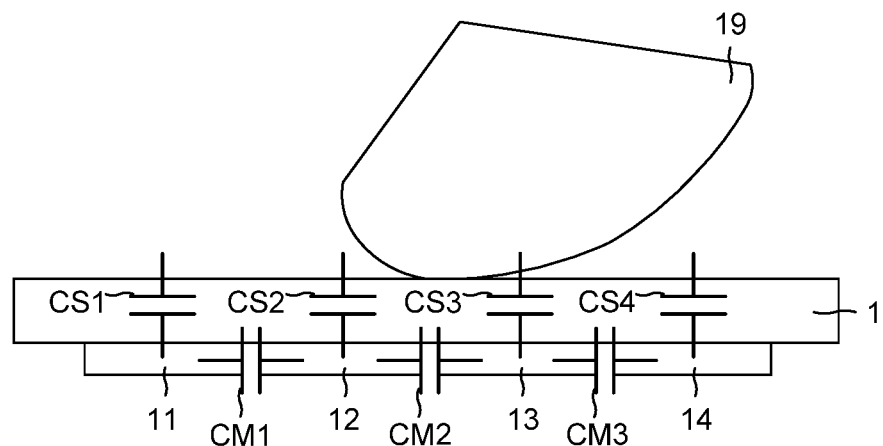
FIG. 1a and FIG. 1b are sectional views of a conventional capacitive touchpad.
Figure 1B:
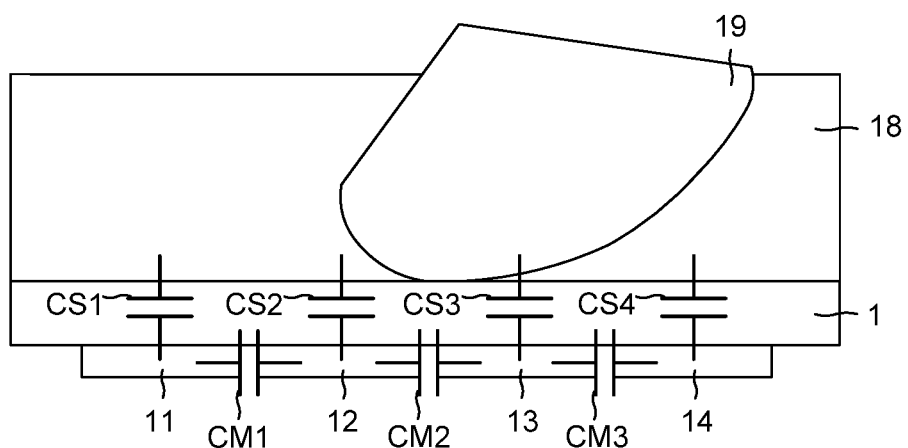
Figure 2:
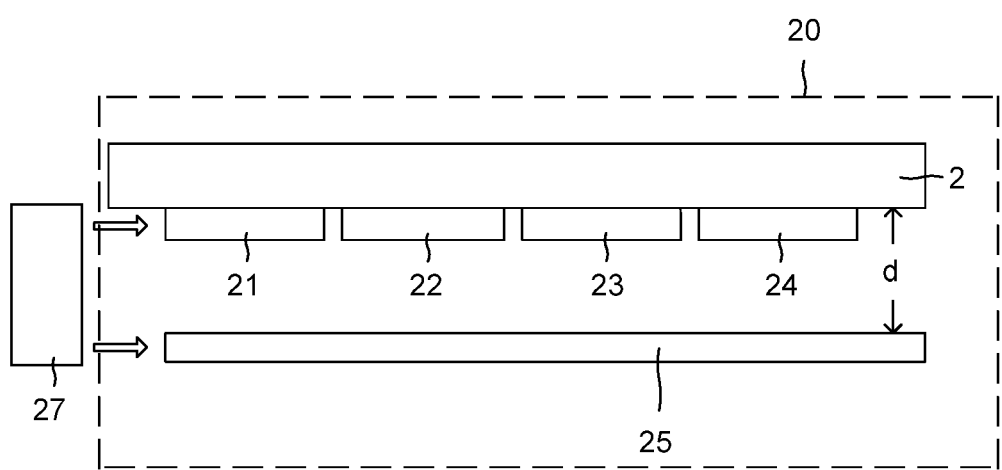
FIG. 2 is a block diagram of a capacitive touch apparatus of the present invention developed for improving drawbacks of the prior art.

FIG. 2 shows a schematic diagram of a capacitive touch apparatus developed improving drawbacks of the prior art. As shown in FIG. 2, the capacitive touch apparatus includes a capacitive touchpad 20 and a touch control circuit 27. The capacitive touchpad 20 includes a substrate 2, a plurality of sensing electrodes 21 to 24, and a common electrode 25. In practice, the common electrode 25 may be additionally disposed for an exclusive use of the present invention, or may be selected from electrodes that are formed by an existing conductive plate in an electronic apparatus provided with such capacitive touchpad and shared with other circuits. For example, when the capacitive touchpad is disposed on a liquid crystal display (LCD) panel, the common electrode 25 may be an electrode that controls the rotation of liquid crystals.

Figure 3A:
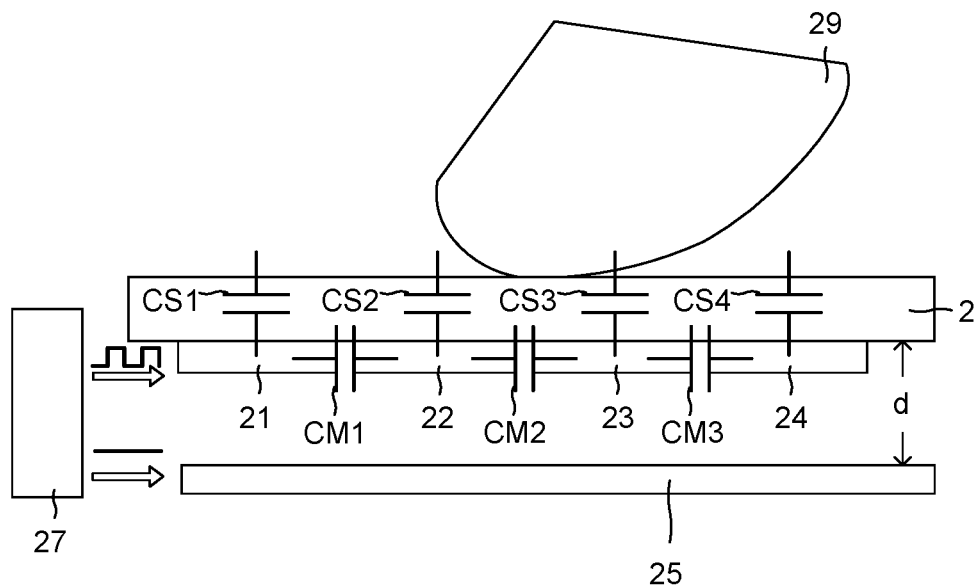
FIG. 3a and FIG. 3b are schematic diagrams of using the apparatus in FIG. 2 to perform technical means for scanning a touch position.

FIG. 3a shows a schematic diagram of a capacitive touch apparatus of the present invention operating in a normal mode. When the capacitive touch apparatus operates in the normal mode, e.g., when the capacitive touch apparatus operates normally in the air, the touch control circuit 27 outputs a touch sensing signal (exemplified by a square wave in FIG. 3a) to the sensing electrodes 21 to 24. When a finger 29 is placed on top of the substrate 2, some electrodes of the sensing electrodes 21 to 24 are caused to be coupled to the finger 29 to generate changes in capacitance values. By using the touch sensing signal to detect the sensing electrodes 21 to 24, the touch control circuit 27 can detect the changes in the mutual capacitances CM1 to CM3 among the sensing electrodes 21 to 24 and the self capacitances SC1 to SC4 of the sensing electrodes 21 to 24 to further estimate the position of the finger 29. When the capacitive touch apparatus operates in the normal mode, the touch control circuit 27 further may provide a fixed voltage to the common electrode 25. For example, the fixed voltage is a ground voltage to prevent the common electrode 25 from affecting touch sensing operations.

Figure 3B:
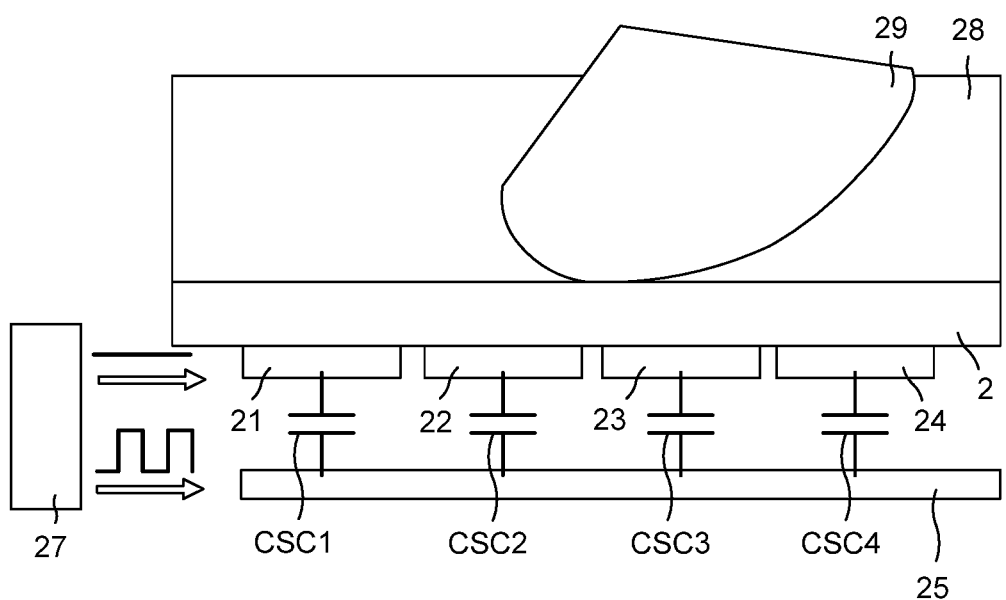

FIG. 3b shows a schematic diagram of a capacitive touch apparatus of the present invention operating in an underwater mode. When the capacitive touch apparatus operates in water, the capacitive touch apparatus switches to operate in the underwater mode. At this point, the touch control circuit 27 outputs the touch sensing signal to the common electrode 25, and provides a fixed voltage to the sensing electrodes 21 to 24. By providing the common electrode 25 and providing the touch sensing signal to the common electrode 25, sensing capacitances CSC1 to CSC4 are respectively formed between the common electrode 25 and the sensing electrodes 21 to 24. When the capacitive touch apparatus operates in the water as shown in FIG. 3b, deformation of the substrate 2 is generated as the user finger 29 presses on the substrate 2, such that a distance between the common electrode 25 and one of the sensing electrodes 21 to 24 is changed from a predetermined distance d to be smaller than the predetermined distance d, meaning that one of the sensing capacitances CSC1 to CSC4 corresponding to the pressed position becomes different (increased in this example) from the remaining capacitance values. As such, the touch control circuit 27 may detect the capacitance values of the sensing capacitance CSC1 to CSC4 between the sensing electrodes 21 to 24 and the common electrode 25 from the sensing electrodes 21 to 24 to accordingly determine the position that is pressed by the finger 29. In practice, apart from adopting a common material such as glass to manufacture the substrate 2, to emphasize the deformation of the substrate 2, a material having a larger flexibility, e.g., poly(methyl methacrylate), commonly referred to as acrylic. Air or another flexible dielectric material layer or a dielectric adhesive (not shown) may be filled between the substrate 2 and the common electrode 25. Operation details of the touch control circuit 27 and the method for determining whether operations are performed in the water or air are to be give shortly.

Figure 4:
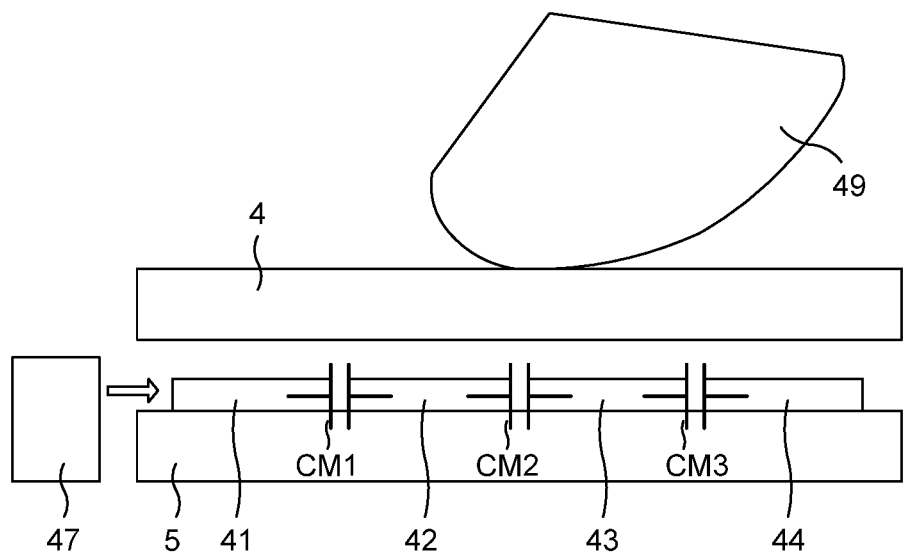
FIG. 4 is a block diagram of a capacitive touchpad according to a second preferred embodiment of the present invention developed for improving drawbacks of the prior art.

FIG. 4 shows a block diagram of a capacitive touchpad according to a second preferred embodiment of the present invention developed for improving drawbacks of the prior art. As seen from FIG. 4, in this embodiment, a plurality of sensing electrodes 41 to 44 are disposed on a surface of another carrier substrate 5 instead of on a surface of a substrate 4. When water (not shown) covers on top of the substrate 4 in a way that a touch position cannot be determined by a conventional scanning method, a touch control circuit 47 is capable of determining the underwater mode. Further, the present invention is capable of detecting the deformation of the substrate 4 caused by a user finger 49 pressing on the substrate 4. In this embodiment, relative positions of the sensing electrodes 41 to 44 are not changed. However, due to the deformation caused by the user finger 49 pressing on the substrate 4, the part that is pressed in the substrate 4 becomes closer to two adjacent sensing electrodes of the sensing electrodes 41 to 44. Thus, a change in the distribution of the dielectric material among the sensing electrodes 41 to 44 is caused, incurring differences among the mutual capacitances CM1 to CM3 among the sensing electrodes 41 to 44. In this embodiment, when the substrate 4 is glass, the dielectric coefficient of glass is approximate four times of that of the air. When the substrate 4 gets close to the sensing electrodes 41 to 44 due to the pressing finger 49, the mutual capacitance values corresponding to the sensing electrodes 41 to 44 are increased, with one pair of sensing electrodes among the sensing electrodes 41 to 44 closest to the position of the substrate 4 pressed by the finger 49 having the largest change in the mutual capacitance value. Thus, in this embodiment, by scanning the plurality of sensing electrodes 41 to 44 by the touch control circuit 47 to detect the mutual capacitance values CM1 to CM3 among the sensing electrodes 41 to 44, and locating the position corresponding to the increased capacitance value, the position of the finger 49 can be estimated.

Figure 5A:
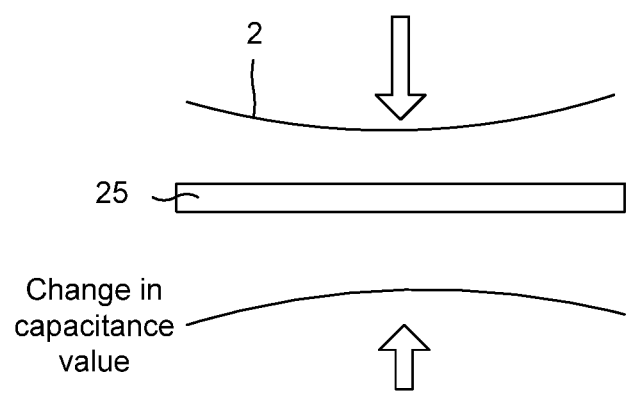
FIG. 5a and FIG. 5b are schematic diagrams of differences in deformation at a border region and a central region of a substrate.
Figure 5B:
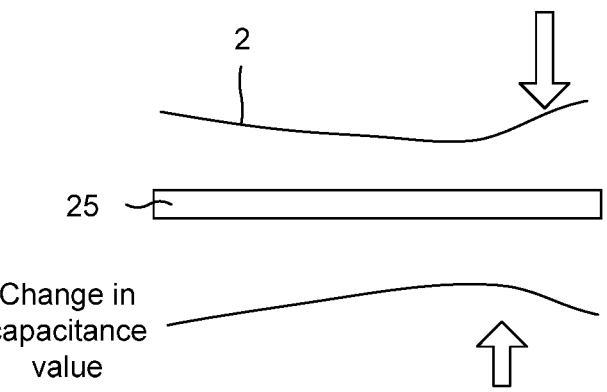
Figure 5C:
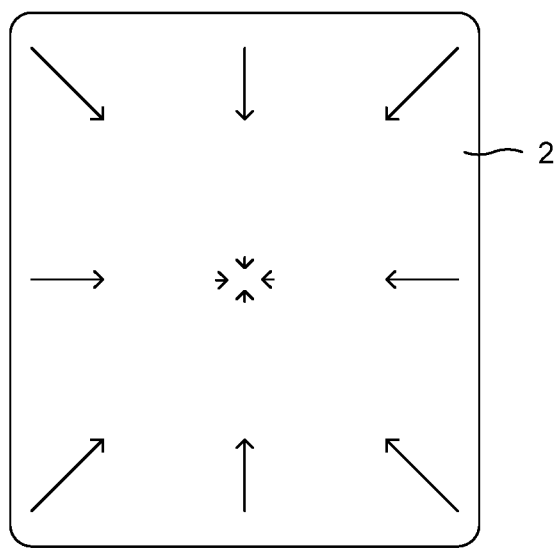
FIG. 5c is a schematic diagram of a position correcting correspondence graph of the present invention.

In the above embodiments, the change in the capacitance value is caused by the deformation of a curved substrate. However, as shown in FIG. 5a and FIG. 5b, even if the force applied by the finger is the same, the levels of deformation at different positions, e.g., at a border region and a central region of the substrate 2, may also be different. As such, the largest change in the capacitance values detected may not necessarily be the correct position of the touch point pressed by the finger, and a determination error may be resulted. Therefore, when determining the position of the touch point, a position correcting correspondence table may be used to perform a corresponding correction as shown in FIG. 5c. The detected touch point is correspondingly shifted to a correct position according to shift vectors (arrows shown in FIG. 5c) corresponding to different positions to provide a more accurate determination for the touch point position. In practice, touch experiments may be performed for various positions on the capacitive touchpad, and the position correcting correspondence table is then generated according to the relationship between the actual touch position and the detected touch position.

Figure 6:
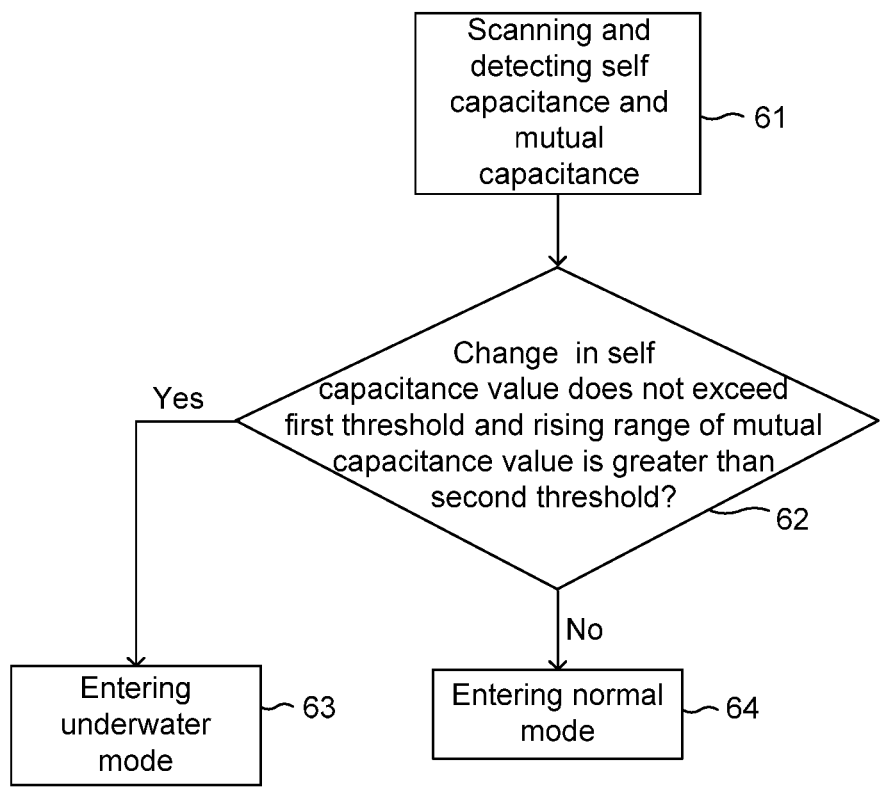
FIG. 6 is a flowchart of an operating mode distinguishing method of the present invention.
Figure 7:
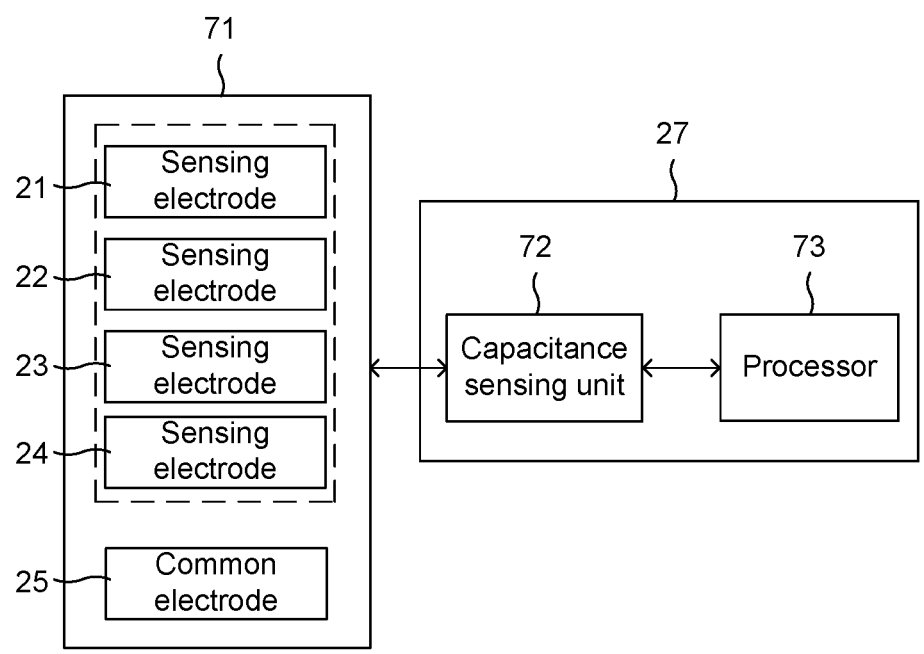
FIG. 7 is a schematic diagram of a capacitive touch apparatus according to an embodiment of the present invention.

Further, to correctly distinguish whether the capacitive touch apparatus is operating in water, the touch control circuit 27 of the present invention may perform the method as shown by the flowchart in FIG. 6. FIG. 7 shows a schematic diagram of a capacitive touch apparatus according to an embodiment of the present invention. As shown, the capacitive touch apparatus includes a capacitive touchpad 71 and a touch control circuit 27. The touch control circuit 27 includes a capacitance sensing unit 72 and a processor 73. In this embodiment, the capacitive touchpad 71 is illustrated by the capacitive touchpad in FIG. 2 to FIG. 3b. In step 61, the capacitance sensing unit 72 detects at least one self capacitance value and at least one mutual capacitance value from the sensing electrodes 21 to 24 of the capacitive touchpad 71. The Applicant has discovered through experiments that, as shown in the occurrence table in Table-1, for both the embodiment in FIG. 2 (commonly referred to as an out-cell touch panel) and the embodiment in FIG. 4 (commonly referred to as an on-cell touch panel), after the capacitive touch apparatus is placed in water, a noticeable rising trend of the mutual capacitance value is measured, whereas the self capacitance value is kept unchanged. It is deduced that, the mutual capacitance values between the adjacent electrodes placed in water are affected by water having a high dielectric coefficient to lead to changes, hence causing the overall mutual capacitance value to rise, with however the self capacitance value kept unchanged. In practice, the touch control circuit 27 may compare the mutual capacitance values that the sensing electrodes 21 to 24 detect at a preceding time point and a subsequent time point to determine the change trend of the mutual capacitance. Similarly, the touch control circuit 27 may also determine the self capacitance values that the sensing electrodes 21 to 24 detect at a preceding time point and a subsequent time point to determine the change trend of the self capacitance.

In step 62, the processor 73 determines the self capacitance value and the mutual capacitance value detected by the capacitance sensing unit 72 to distinguish the operating mode of the capacitive touch apparatus. When the change in the self mutual capacitance value does not exceed a first threshold and a rising range of the mutual capacitance value is greater than a second threshold, the processor 73 determines that the capacitive touch apparatus is placed in water, and determines to cause the capacitive touch apparatus to operate in an underwater mode (step 63). When the change in the self capacitance value exceeds the first threshold or the rising range of the mutual capacitance value is smaller than the second threshold, the processor 73 determines that the capacitive touch apparatus is not placed in water, and determines to cause the capacitive touch apparatus to operate in a normal mode (step 64). The touch control circuit performs a determination operation at a predetermined time interval, e.g., once every half second, to determine whether the operating environment is changed.

TABLE 1

| Type of capacitance | | Pressed and operated by a finger under normal state | In water but not pressed by finger | In water and pressed by finger |
|---|---|---|---|---|
| out-cell touch | CM capacitance | dropping | Having rising trend but | Having rising trend but |

TABLE 1-continued

| | Type of capacitance | Pressed and operated by a finger under normal state | In water but not pressed by finger | In water and pressed by finger |
|---|---|---|---|---|
| panel | value | | cannot be positioned | cannot be positioned |
| | CS capacitance value | rising | unchanged | Having rising trend but cannot be positioned |
| | CSC capacitance value | unchanged | unchanged | Having rising trend and can be used for positioning |
| on-cell touch panel | CM capacitance value | dropping | Having rising trend but cannot be positioned | Having rising trend and can be used for positioning |
| | CS capacitance value | rising | unchanged | Having rising trend but cannot be positioned |

Again referring to FIG. 7, when the capacitive touch apparatus operates in the normal mode, the capacitance sensing unit 72 provides a fixed voltage to the common electrode 25 in the capacitive touchpad 71, and outputs a touch sensing signal to the sensing electrodes 21 to 24 in the capacitive touchpad 71. Accordingly, the capacitance values of the mutual capacitances CM1 to CM3 and/or self capacitances CS1 to SC4 are detected from the sensing electrodes 21 to 24, and a sensing result is outputted to the processor 73. The processor 73 then calculates the position of the touch point according to the sensing result generated by the capacitance sensing unit 72. When the capacitive touch apparatus operates in the underwater mode, the capacitance sensing unit 72 changes to provide the fixed voltage to the sensing electrodes 21 to 24, and outputs the touch sensing signal to the common electrode 25. Accordingly, the capacitance values of the sensing capacitances CSC1 to CSC4 between the common electrode 25 and the sensing electrodes 21 to 24 can be detected, and a sensing result is outputted to the processor 73. The processor 73 then calculates the position of the touch point according to the sensing result generated by the capacitance sensing unit 72.

In conclusion, the apparatus and method of the present invention are capable of solving the drawback of the incapability of performing touch detection under water of a conventional capacitive touchpad, and may thus be extensively applied to underwater cameras or touchpads and keys of waterproof smart phones.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch point locating method, applied to a capacitive touch apparatus comprising a plurality of sensing electrodes and a common electrode, comprising:
providing a touch sensing signal to the sensing electrodes when the capacitive touch apparatus operates in a normal mode, and providing the touch sensing signal to the common electrode when the capacitive touch apparatus operates in an underwater mode;
detecting a plurality of capacitance values from the sensing electrodes in response to the touch sensing signal; and
determining a position of a touch point according to the capacitance values.

2. The touch point locating method according to claim 1, further comprising:
providing a fixed voltage to the sensing electrodes when the capacitive touch apparatus operates in the underwater mode and the touch sensing signal is inputted to the common electrode.

3. The touch point locating method according to claim 1, wherein the capacitance values are capacitance values between the sensing electrodes and the common electrode when the capacitive touch apparatus operates in the underwater mode.

4. The touch point locating method according to claim 1, further comprising:
correcting the position of the touch point by using a position correcting correspondence table.

5. The touch point locating method according to claim 1, wherein the capacitive touch apparatus further comprises a substrate, the sensing electrodes are disposed on the substrate, and a distance between the common electrode and at least one sensing electrode of the sensing electrodes is changed by deformation of the substrate caused by the touch point.

6. The touch point locating method according to claim 1, wherein the capacitive touch apparatus further comprises a substrate, the sensing electrodes are disposed on the substrate, and the capacitance values are associated with deformation of the substrate caused by the touch point.

7. A touch control circuit, adapted to control a capacitive touchpad comprising a plurality of sensing electrodes and a common electrode, the touch control circuit comprising:
a capacitance sensing unit, when operating in a normal mode, outputting a touch sensing signal to the sensing electrodes and detecting a plurality of capacitance values from the sensing electrodes to accordingly output a sensing result; when operating in an underwater mode, outputting the touch sensing signal to the common electrode, and detecting the plurality of capacitance values from the sensing electrodes to accordingly generate the sensing result; and
a calculating unit, calculating a position of a touch point according to the sensing result.

8. The touch control circuit according to claim 7, wherein when operating in the underwater mode, the capacitance sensing unit detects a plurality of capacitance values between the sensing electrodes and the common electrode from the sensing electrodes.

9. The touch control circuit according to claim 8, wherein the capacitive touchpad further comprises a substrate, the sensing electrodes are disposed on the substrate, and the capacitance values are associated with deformation of the substrate caused by the touch point when the touch control circuit operates in the underwater mode.

10. The touch control circuit according to claim 7, wherein when the touch control circuit operates in the normal mode, the capacitance sensing unit further outputs a fixed voltage to the common electrode.

* * * * *